(12) United States Patent
Breuer et al.

(10) Patent No.: US 12,499,769 B2
(45) Date of Patent: Dec. 16, 2025

(54) COMMUNICATION SYSTEM FOR AN AIRCRAFT

(71) Applicant: AIRBUS HELICOPTERS DEUTSCHLAND GMBH, Donauworth (DE)

(72) Inventors: Dieter Breuer, Bichl (DE); Frank Roth, Noerdlingen (DE); Daniel Sauseng, Nordendorf (DE); Thomas Boehm, Hurlach (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 382 days.

(21) Appl. No.: 18/107,052

(22) Filed: Feb. 8, 2023

(65) Prior Publication Data
US 2023/0360536 A1 Nov. 9, 2023

(30) Foreign Application Priority Data
Mar. 30, 2022 (EP) .................................... 22400001

(51) Int. Cl.
*G08G 5/20* (2025.01)
(52) U.S. Cl.
CPC ...................................... *G08G 5/20* (2025.01)
(58) Field of Classification Search
CPC .................................. G08G 5/20; H04K 1/00
See application file for complete search history.

(56) References Cited

U.S. PATENT DOCUMENTS

| 4,167,700 A | 9/1979 | Coe et al. |
| 4,903,298 A | 2/1990 | Cline |
| 6,356,638 B1 * | 3/2002 | Hardy ...................... H04K 1/00 380/42 |
| 9,100,361 B1 | 8/2015 | Lucchesi et al. |
| 2005/0135618 A1 * | 6/2005 | Aslam ................ H04N 21/4623 380/212 |

FOREIGN PATENT DOCUMENTS

| EP | 0779760 B1 | 6/1997 |
| EP | 2658173 B1 | 10/2013 |
| EP | 2779480 B1 | 4/2019 |

OTHER PUBLICATIONS

European Search Report for European Application No. EP 22400001.8, Completed by the European Patent Office, Dated Sep. 15, 2022, 8 pages.

* cited by examiner

*Primary Examiner* — Russell Frejd
(74) *Attorney, Agent, or Firm* — BROOKS KUSHMAN P.C.

(57) ABSTRACT

A communication system for an aircraft, comprising a plurality of radios including at least a first radio that is operable in an encrypted mode for transmitting/receiving encrypted audio signals, and a second radio that is operable in a clear mode for transmitting/receiving unencrypted audio signals; an intercom system that interconnects the plurality of radios, wherein the plurality of radios is connected to the intercom system via a plurality of communication lines; and a security module that is configured to connect or disconnect selected ones of the plurality of communication lines for inhibiting simultaneous transmission of an encrypted audio signal via the first radio and an unencrypted audio signal via the second radio.

20 Claims, 4 Drawing Sheets

COMMUNICATION SYSTEM FOR AN AIRCRAFT

CROSS-REFERENCE TO RELATED APPLICATIONS

This application claims priority to European patent application No. EP 22400001.8 filed on Mar. 30, 2022, the disclosure of which is incorporated in its entirety by reference herein.

TECHNICAL FIELD

The present disclosure relates to a communication system for an aircraft, comprising a plurality of radios and an intercom system that interconnects the plurality of radios. The present disclosure further relates to an aircraft comprising such a communication system, as well as a method of operating such a communication system.

BACKGROUND

The documents U.S. Pat. No. 9,100,361 B1 and EP 2 779 480 B1 respectively describe a communication system with a plurality of radios and an intercom system in an aircraft. The radios of the plurality of radios in the document EP 2 779 480 B1 are implemented as wireless communications units.

More generally, communication systems with a plurality of radios which are connected via a plurality of communication lines to an intercom system that interconnects the plurality of radios are well-known in aviation and widely used in different types of aircrafts. However, an underlying system complexity of a communication system in a given aircraft largely depends on a respective use of the given aircraft, i.e., on whether the given aircraft is foreseen for civil, parapublic or military use.

In civil and parapublic use, there are normally no particular restrictions imposed on communication systems in aircrafts with respect to protection of potentially sensitive audio signals. Thus, there is no need for electrical separation or blocking and no prevention of electrical coupling of potentially sensitive audio signals e.g., into microphone signals which are transmitted in clear form.

In contrast thereto, communication systems in aircrafts which are foreseen for military use must guarantee a comparatively high level of protection of potentially sensitive audio signals. Illustrative communication systems in general, i.e., independent of use with an aircraft, which guarantee a certain level of protection of potentially sensitive audio signals, are e.g., described in the documents U.S. Pat. No. 4,167,700 A and EP 0 779 760 B1.

In aircrafts, however, a comparatively high level of protection of potentially sensitive audio signals is usually achieved by use of a highly sophisticated and expensive so-called TEMPEST (Telecommunications Electronic Material Protected from Emanating Spurious Transmission) proven communication system. More particularly, such a TEMPEST proven communication system prevents coupling of decrypted audio signals into clear, i.e., unencrypted audio signals by technical/electrical separation of these signals into so-called red and black areas, by filtering of these signals to prevent coupling by power supply, and by physical distance separation of an underlying wire routing. An illustrative TEMPEST proven system with associated red and black areas is described in the document EP 2 658 173 B1.

Provision of such a TEMPEST proven communication system in a given aircraft is required to obtain, by the respectively competent authorities, an approval for participation of the given aircraft in military missions. By way of example, such an approval is given in Germany by the Federal Office for Information Security (BSI) as competent authority and it is forbidden to use the given aircraft in military missions without such an approval.

However, all measures required for installation of a TEMPEST proven communication system in an aircraft lead to a comparatively high development effort and a comparatively high system complexity. Furthermore, space sufficient must be available in the aircraft to enable physical separation of audio signals by physical distance separation of an underlying wire routing, thus, resulting in a high installation effort. In particular cases, installation of optical signal transmission may even be required with a comparatively high installation effort per se.

As a consequence, installation of such a TEMPEST proven communication system in a small helicopter that should be used in military missions, such as e.g., the Airbus Helicopters H145M, is complicated and expensive.

The document U.S. Pat. No. 4,903,298 describes .voice and data radio communication between an aircraft in flight and a ground station. The aircraft has a plurality of radio transceivers and an audio control system to selectively route audio inputs and outputs from one of the transceivers to an audio device. Control switches controlled manually an encryption unit. The encryption unit may be bypassed in a clear mode (un-encrypted) and paths from the aircraft audio routing system are connected directly to the respective transceivers in the un-encrypted mode.

SUMMARY

It is, therefore, an object of the present disclosure to provide a new communication system for an aircraft, which provides for a comparatively high level of protection of potentially sensitive audio signals such that an aircraft that is equipped with this new communication system may obtain approval for participation in military missions by the competent authorities.

This object is solved by a communication system with a plurality of radios which are connected via a plurality of communication lines to an intercom system that interconnects the plurality of radios, said communication system comprising the features of claim 1.

More specifically, a communication system for an aircraft is provided, comprising a plurality of radios, an intercom system, and a security module. The plurality of radios includes at least a first radio that is operable in an encrypted mode for transmitting/receiving encrypted audio signals, and a second radio is that operable in a clear mode for transmitting/receiving unencrypted audio signals. The intercom system interconnects the plurality of radios, wherein the plurality of radios is connected to the intercom system via a plurality of communication lines. The security module is configured to connect or disconnect selected ones of the plurality of communication lines for inhibiting simultaneous transmission of an encrypted audio signal via the first radio and an unencrypted audio signal via the second radio.

Advantageously, provision of the security module enables an unintended dissemination of confidential information by simply blocking reception/transmission of potentially sensitive encrypted or decrypted audio signals. Thereby, a communication system may be provided, which is inexpensive, light weight and simple to install.

With the disclosure, the security module is configured for inhibiting simultaneous transmission thus involving an automated inhibiting. This inhibiting automatically prevents simultaneous transmission of encrypted and unencrypted signals. With the inhibiting logic, the disclosure can for instance solve any conflict between simultaneous transmission of encrypted and unencrypted signals without any manual crew action, e.g., thanks to feeding results of detections to logic to inform the security module about which signal is encrypted or unencrypted.

More specifically, a comparatively uncomplex and inexpensive communication system that is adapted for civil or parapublic use may be used together with the security module for obtention of at least a minimum of approvals for military use from the respectively competent authorities. Even respective installation approvals of the communication system that is adapted for civil or parapublic use may be reapplied. In conclusion, this comparatively uncomplex and inexpensive communication system together with the security module may be used in aircrafts that are foreseen for military use instead of an expensive and heavy TEMPEST proven communication system and wiring.

According to one aspect, the security module is adapted to detect if a received audio signal is received by a radio of the communication system of a given aircraft on an encrypted channel and is then decrypted. If at the same time an audio transmission on a clear, i.e., unencrypted or non-crypted channel happens, the security module stops reception of the encrypted audio signal already inside the radio or just at a respective audio output of the radio. Thus, coupling of sensitive information on communication lines, e.g., cables inside the given aircraft, or inside the intercom system is prevented.

Vice versa: if a sensitive audio signal is going to be encrypted and then being transmitted, and at the same time a clear, i.e., unencrypted or non-crypted audio signal is received at a radio of the communication system, transmission of the encrypted audio signal is blocked. In fact, the received clear audio signal may couple into the sensitive audio signal that is going to be encrypted and then being transmitted. Knowing that the clear audio signal would be hidden in the encrypted and transmitted audio signal, and knowing further the clear audio signal by just spying it on a respective radio frequency, a correlation between the clear audio signal and the encrypted audio signal is possible. By this correlation a re-calculation of an applied crypto key used for encryption can be performed so that the crypto key is detectable and may be determined. To prevent this, the security module generally blocks, by logic, transmission of an encrypted audio signal whenever a clear audio signal is received on a different radio at the same time.

According to one aspect, when a radio or, more generally, an audio channel is blocked, this may be indicated by a suitable indicator, light or message in a primary display system of the given aircraft.

Furthermore, according to one aspect the security module may be switched off. Thus, civil approval of the communication system is reached as, in this case, all audio signals are connected according to civil airworthiness approval regulations of the communication system.

Preferably, the security module is configured to deactivate the first radio for blocking receipt or transmission of an encrypted audio signal at the first radio, if the second radio is sending or receiving an unencrypted audio signal.

Preferably, the security module is configured to deactivate the first radio for blocking receipt of an encrypted audio signal at the first radio by disabling receipt of the encrypted audio signal at the first radio and/or disabling transmission of the encrypted audio signal via the first radio to the intercom system after decryption.

Preferably, the security module is configured to send a discrete blocking command to the first radio for disabling receipt of the encrypted audio signal at the first radio.

Preferably, the security module is configured to interrupt a communication line of the plurality of communication lines that connects the first radio to the intercom system for disabling transmission of the encrypted audio signal via the first radio to the intercom system after decryption.

Preferably, the security module is configured to deactivate the first radio for blocking transmission of an encrypted audio signal via the first radio before encryption, if the second radio is sending or receiving an unencrypted audio signal.

According to one aspect, the security module may block transmission of an encrypted audio signal via the first radio by sending a discrete blocking command to the first radio for disabling transmission of the encrypted audio signal via the first radio.

Preferably, the security module is configured to detect receipt of an encrypted audio signal via the first radio, or of an unencrypted audio signal via the second radio.

Preferably, the security module is configured to detect receipt of an encrypted audio signal via the first radio, or of an unencrypted audio signal via the second radio, by monitoring associated receipt indication lines of the first and second radios.

Preferably, the communication system further comprises at least one indicator for indicating deactivation of the first radio.

According to one aspect, the at least one indicator comprises at least one summary indicator for indicating deactivation of a predetermined number of radios of the plurality of radios.

Preferably, the at least one indicator is controlled by means of the security module.

According to one aspect, the security module is connected to the intercom system via an associated information transmission line, such that the intercom system may provide information, such as status information, to the security module.

Preferably, the communication system further comprises a switch that is provided to enable switching-off of the security module.

The present disclosure further relates to an aircraft comprising a communication system as described above.

The present disclosure further relates to a method of operating a communication system as described above, comprising: detecting receipt of an incoming audio signal via a radio of the communication system; determining whether the incoming audio signal is encrypted or unencrypted; if the incoming audio signal is encrypted, determining whether transmission of an unencrypted audio signal via another radio is in progress; and if transmission of an unencrypted audio signal via another radio is in progress, blocking receipt of the incoming audio signal.

Preferably, the method further comprises: if the incoming audio signal is unencrypted, determining whether transmission of an encrypted audio signal via another radio is in progress; and if transmission or receipt of an encrypted audio signal via another radio is in progress, blocking transmission of the encrypted audio signal.

Preferably, the method further comprises: providing a visible and/or audible indication, if receipt of the incoming audio signal is blocked, or if transmission of the encrypted audio signal is blocked.

BRIEF DESCRIPTION OF THE DRAWINGS

Preferred embodiments are outlined by way of example in the following description with reference to the attached drawings. In these attached drawings, identical or identically functioning components and elements are labeled with identical reference numbers and characters and are, consequently, only described once in the following description.

DETAILED DESCRIPTION

Figure 1:
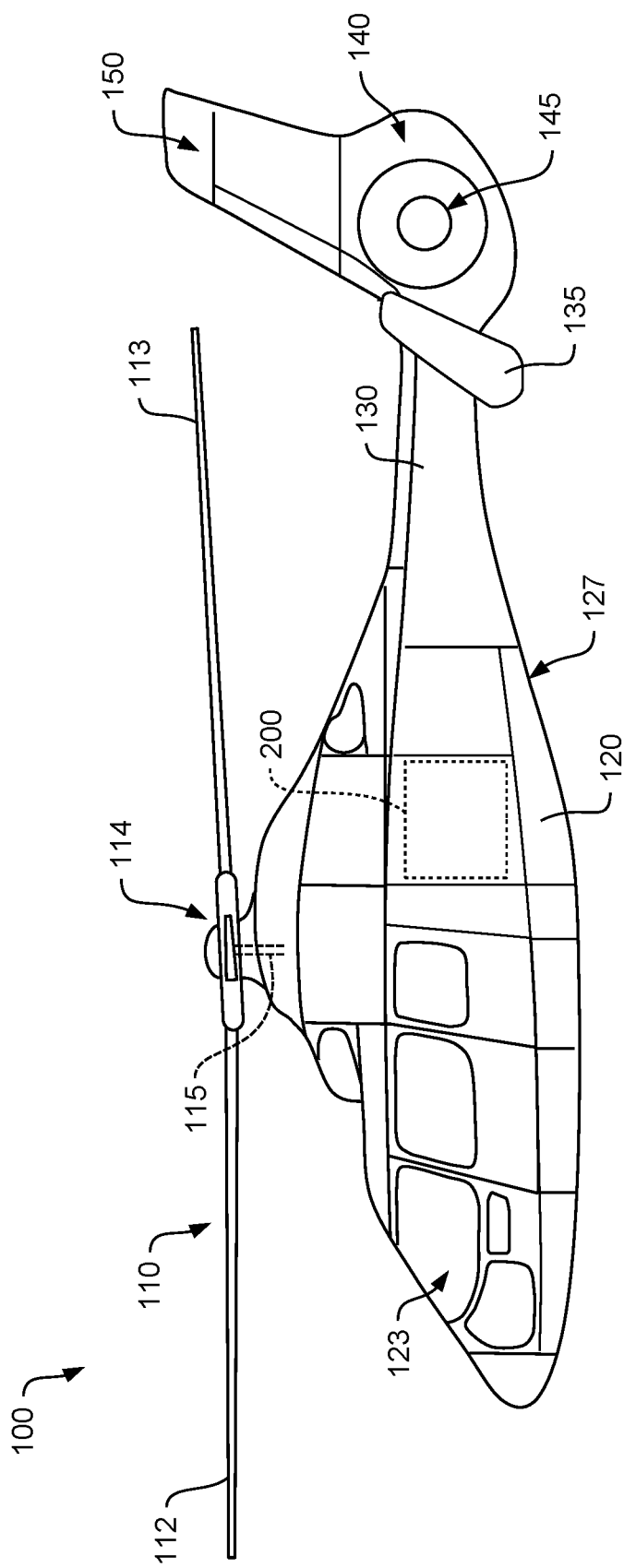
FIG. 1 shows a side view of an illustrative aircraft with a communication system in accordance with some embodiments.

FIG. 1 shows an illustrative aircraft 100. By way of example, the aircraft 100 is embodied as a rotary-wing aircraft and, more particularly, as a helicopter. Thus, for purposes of simplicity and clarity, the aircraft 100 is hereinafter referred to as the "helicopter 100". However, the present disclosure is likewise applicable to other types of aircrafts, such as airplanes, quadcopters, and so on, and may even be used in spacecrafts.

According to one aspect of the present disclosure, the helicopter 100 comprises a communication system 200. A preferred embodiment of the communication system 200 is described below at FIG. 2.

Illustratively, the helicopter 100 further comprises at least one main rotor 110 with a rotor shaft 115. By way of example, the at least one main rotor 110 is embodied as a multi-blade rotor system, for providing lift and forward or backward thrust during operation. Accordingly, the at least one main rotor 110 comprises a plurality of rotor blades 112, 113 which are e.g., mounted at an associated rotor head 114 to the rotor shaft 115.

Illustratively, the helicopter 100 has a fuselage 120 that forms an airframe of the helicopter 100. The fuselage 120 may be connected to a suitable landing gear and forms, by way of example, a cabin 123 and a rear fuselage 127. The rear fuselage 127 is illustratively connected to a tail boom 130.

By way of example, the helicopter 100 includes at least one counter-torque device 140 configured to provide counter-torque during operation, i.e., to counter the torque created by rotation of the at least one main rotor 110 for purposes of balancing the helicopter 100 in terms of yaw. If desired, counter-torque device 140 may be shrouded as shown.

The at least one counter-torque device 140 is illustratively provided at an aft section of the tail boom 130 and comprises a tail rotor 145. The aft section of the tail boom 130 further comprises a fin 150. Illustratively, the tail boom 130 is also provided with a suitable horizontal stabilizer 135.

Figure 2:
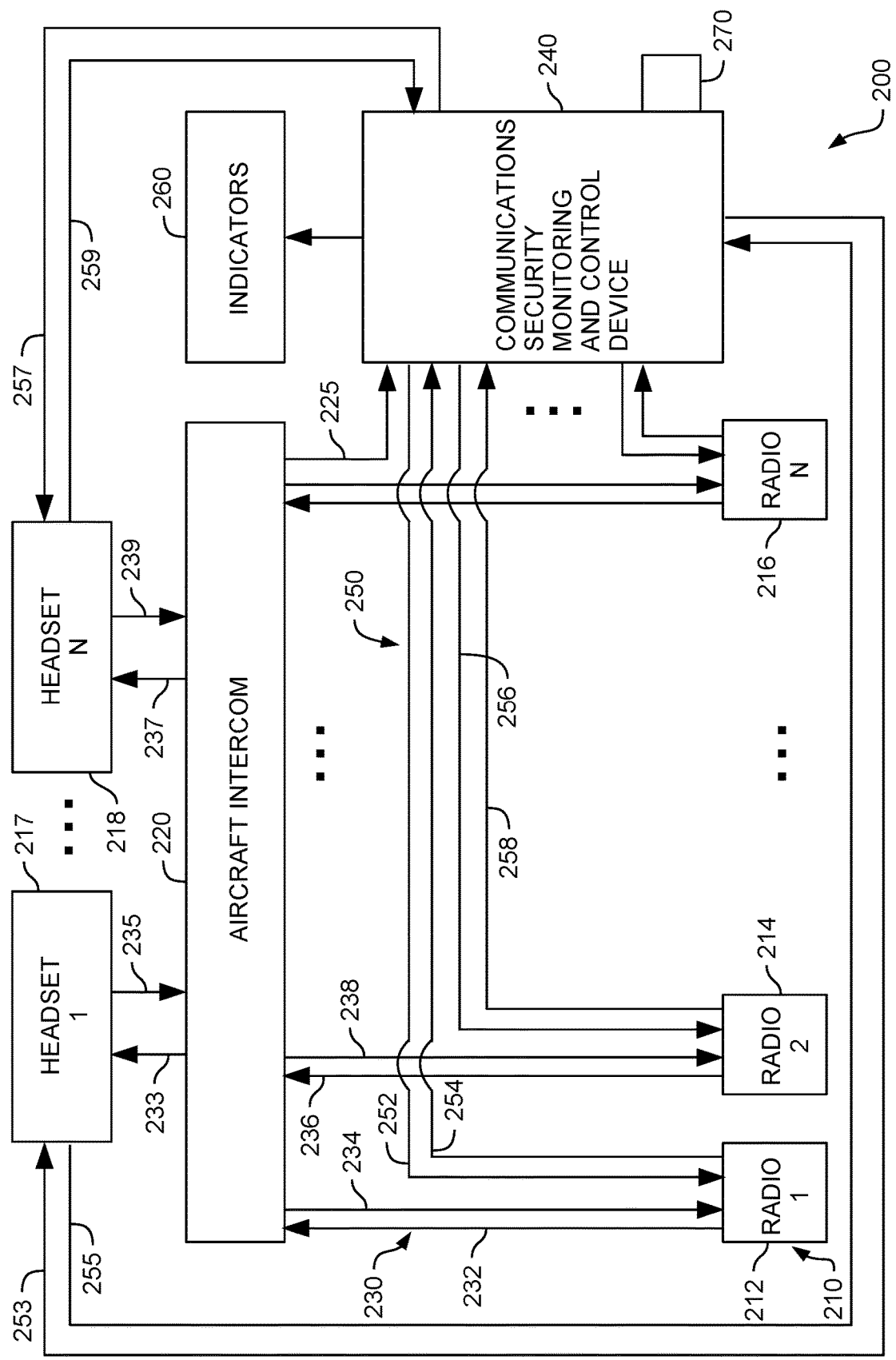
FIG. 2 shows a schematic view of the communication system of FIG. 1 in accordance with some embodiments.

FIG. 2 shows the communication system 200 of FIG. 1. Preferably, the communication system 200 comprises at least a plurality of radios 210, an intercom system 220, and a security module 240. By way of example, the plurality of radios 210 comprises a predetermined number N of radios. Illustratively, three radios of the predetermined number N of radios are separately labeled with the reference signs 212, 214, 216.

The plurality of radios 210 is preferably connected to the intercom system 220 via a plurality of communication lines 230. Thus, the intercom system 220 interconnects the plurality of radios 210. The intercom system 220 is illustratively also connected to the security module 240 via an associated information transmission line 225, such that the intercom system 220 may provide information, such as status information, to the security module 240.

Preferably, at least one radio of the plurality of radios 210, e.g., the radio 212, is operable in an encrypted mode for transmitting/receiving encrypted audio signals. Furthermore, preferably at least one other radio of the plurality of radios 210, e.g., the radio 214, is operable in a clear mode for transmitting/receiving unencrypted audio signals, which may also be referred to as "clear audio signals".

The radio 212 is illustratively connected to the intercom system 220 via associated communication lines 232, 234 of the plurality of communication lines 230. Similarly, the radio 214 is connected to the intercom system 220 via associated communication lines 236, 238 of the plurality of communication lines 230. However, for simplicity and clarity of the drawing respective communication lines which connect the radio 216 to the intercom system 220 are not separately labeled.

Illustratively, the plurality of radios 210 is connected to the security module 240 via a plurality of connection lines 250. By way of example, the radio 212 is connected to the security module 240 via associated connection lines 252, 254 of the plurality of connection lines 250. Similarly, the radio 214 is connected to the security module 240 via associated connection lines 256, 258 of the plurality of connection lines 250. However, for simplicity and clarity of the drawing respective connection lines which connect the radio 216 to the security module 240 are not separately labeled.

In addition, one or more headsets may be connected to the intercom system 220 and the security module 240. By way of example, two headsets 217, 218 are illustratively connected to the intercom system 220 and the security module 240. By way of example, the headset 217 may be provided for a co-pilot of the helicopter 100 of FIG. 1, and the headset 218 may be provided for a pilot of the helicopter 100 of FIG. 1.

More specifically, the headset 217 is connected to the intercom system 220 via associated communication lines 233, 235 of the plurality of communication lines 230, and to the security module 240 via associated connection lines 253, 255 of the plurality of connection lines 250. Similarly, the headset 218 is connected to the intercom system 220 via associated communication lines 237, 239 of the plurality of communication lines 230, and to the security module 240 via associated connection lines 257, 259 of the plurality of connection lines 250. The connection lines 253, 257 may be used to break sending of microphone signals from the headsets 217, 218 to the intercom system 220. The connection lines 255, 259 may be used to suppress respective Push-To-Talk (PTT) signals from the headsets 217, 218 to the intercom system 220.

The security module 240 may further be connected to one or more associated indicators 260 which are provided for indicating e.g., status information of the security module 240 and, more generally, of the communication system 200 in operation. According to one aspect, the one or more associated indicators 260 comprise at least one summary indicator for indicating deactivation of a predetermined number of radios of the plurality of radios.

More specifically, at least one of the one or more indicators 260 may visibly and/or audibly indicate deactivation of an associated radio of the plurality of radios 210, e.g., the radio 212. Preferably, the at least one of the one or more indicators 260 is controlled by the security module 240.

Moreover, the security module 240 may be provided with a switch 270, which is preferably provided to enable switching of the communication system 200 from a civil/parapublic operating mode to a military operating mode. By way of example, the switch 270 may be an ON/OFF switch that is provided to enable switching-off of the security module 240. In other words, the switch 270 may e.g., be set to "ON" for activating the security module 240 in the military operating mode, and it may be set to "OFF" for switching-off, i.e., deactivating the security module 240 in the civil/parapublic operating mode.

Preferably, the security module 240 is configured to connect or disconnect selected ones of the plurality of communication lines 230 for inhibiting simultaneous transmission of an encrypted audio signal via one of the radios of the plurality of radios 210, e.g., the radio 212, and an unencrypted audio signal via another one of the plurality of radios 210, e.g., the radio 214. For instance, the security module 240 may be configured to deactivate the radio 212 for blocking receipt or transmission of an encrypted audio signal at the radio 212, if the radio 214 is sending or receiving an unencrypted audio signal. More specifically, the security module 240 may be configured to deactivate the radio 212 for blocking receipt of an encrypted audio signal at the radio 212 by disabling receipt of the encrypted audio signal at the radio 212 and/or disabling transmission of the encrypted audio signal via the radio 212 to the intercom system 220 after decryption.

By way of example, the security module 240 may deactivate the radio 212 for blocking receipt of the encrypted audio signal by sending a discrete blocking command to the radio 212 for disabling receipt of the encrypted audio signal at the radio 212. Preferably, the discrete blocking command is sent from the security module 240 via the connection line 252 to the radio 212.

Alternatively, or in addition, the security module 240 may deactivate the radio 212 for disabling transmission of the encrypted audio signal via the radio 212 to the intercom system 220 after decryption by interrupting the communication line 232 of the plurality of communication lines 230 that connects the radio 212 to the intercom system 220. Thus, transmission of the encrypted audio signal via the radio 212 to the intercom system 220 after decryption is prevented and, as a result, the radio 212 is deactivated.

Preferably, the security module 240 is further configured to deactivate a radio of the plurality of radios 210, e.g., the radio 212, for blocking transmission of an encrypted audio signal via this radio, i.e., the radio 212, before encryption, if another one of the plurality of radios 210, e.g., the radio 214, is sending or receiving an unencrypted audio signal. For instance, the security module 240 may block transmission of an encrypted audio signal via the radio 212 by sending a discrete blocking command to the radio 212 for disabling transmission of the encrypted audio signal via the radio 212. Preferably, the discrete blocking command is sent from the security module 240 via the connection line 252 to the radio 212.

Furthermore, the security module 240 may be configured to detect receipt of an encrypted audio signal via one radio of the plurality of radios 210, e.g., the radio 212, and/or of an unencrypted audio signal via another one of the plurality of radios 210, e.g., the radio 214. Preferably, the security module 240 is configured to detect receipt of an encrypted audio signal via the radio 212 by monitoring the connection line 254 that connects the radio 212 to the security module 240 and, thus, functions as a receipt indication line. Similarly, the security module 240 is configured to detect receipt of an unencrypted audio signal via the radio 214 by monitoring the connection line 258 that connects the radio 214 to the security module 240 and, thus, also functions as a receipt indication line.

Figure 3:
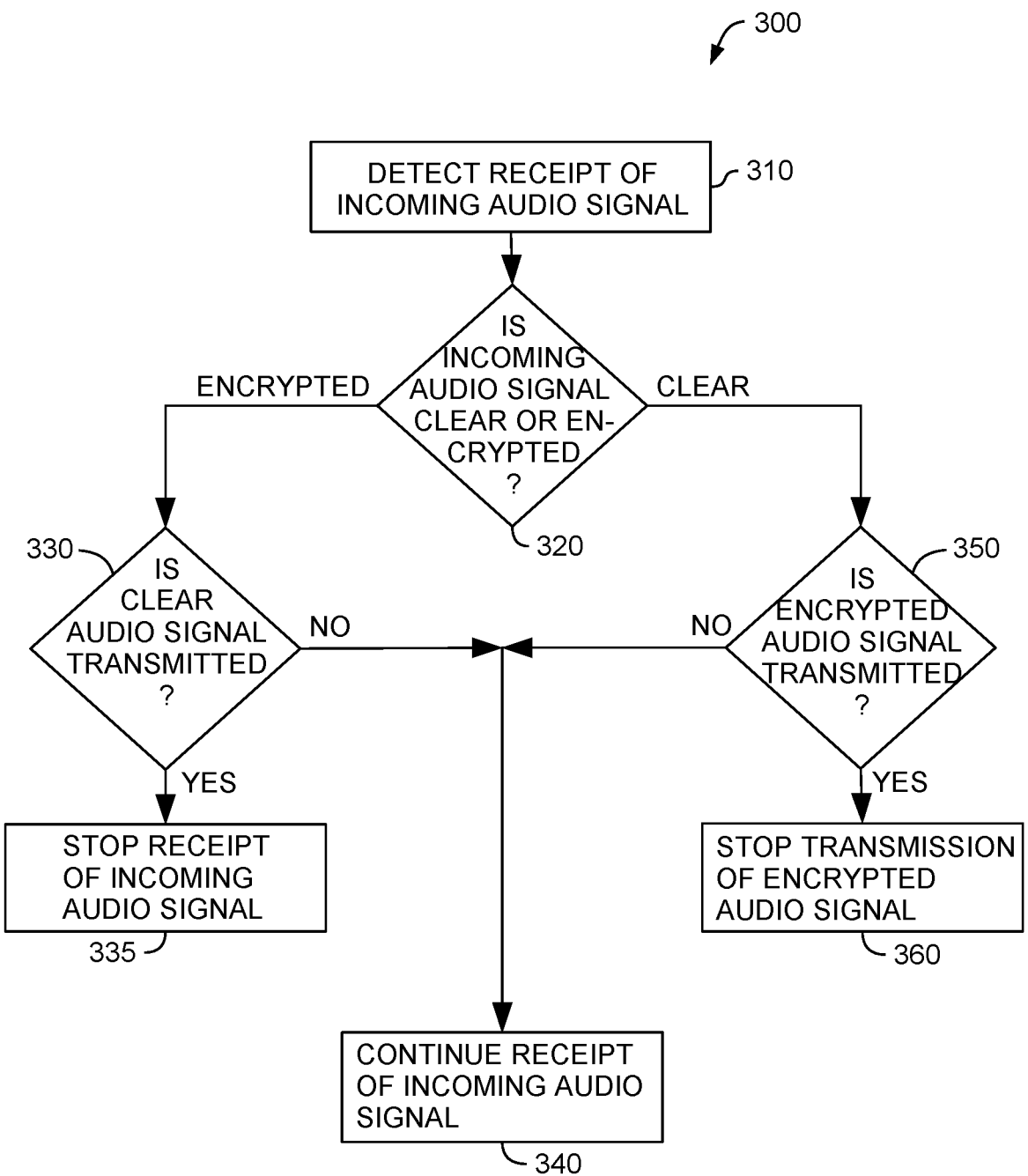
FIG. 3 shows a flow diagram illustrating an operation of the communication system of FIG. 2 in accordance with some embodiments.

FIG. 3 shows an illustrative method 300 of operating the communication system 200 of FIG. 2, e.g., in the helicopter 100 of FIG. 1. According to one aspect, the method 300 comprises a plurality of steps which are preferably performed by the security module 240 of the communication system 200 of FIG. 2.

The method starts at step 310 with detection of an incoming audio signal. More specifically, at step 310 receipt of an incoming audio signal via a first radio of the plurality of radios 210 of the communication system 200 of FIG. 2 is detected. For instance, the receipt is detected by monitoring the plurality of f connection lines 250 of FIG. 2, which function as receipt indication lines.

At step 320, it is determined whether the incoming audio signal that is received via the first radio is encrypted or unencrypted, i.e., clear. If the incoming audio signal is encrypted, e.g., if the incoming audio signal is received via the radio 212 of FIG. 2, the method 300 continues at step 330.

At step 330, it is determined whether transmission of an unencrypted audio signal via another, i.e., a second radio of the plurality of radios 210 of FIG. 2 is in progress, e.g., via the radio 214 of FIG. 2. For instance, the transmission is detected by monitoring the plurality of connection lines 250 of FIG. 2, which function as receipt indication lines.

If transmission of an unencrypted audio signal via the second radio, e.g., via the radio 214 of FIG. 2, is in progress, the method 300 continues at step 335. Otherwise, the method 300 continues at step 340, where receipt of the incoming audio signal via the first radio is authorized and continued.

At step 335, receipt of the incoming audio signal via the first radio is blocked. For instance, the first radio is deactivated for blocking receipt of the incoming audio signal by sending a discrete blocking command to the first radio for disabling receipt of the incoming audio signal at the first radio. Alternatively, or in addition, the first radio may be deactivated for disabling transmission of the incoming audio signal via the first radio to the intercom system 220 of FIG. 2 after decryption, by interrupting the communication line that connects the first radio to the intercom system 220 of FIG. 2, i.e., the communication line 232 of FIG. 2. Thus, transmission of the encrypted audio signal via the first radio to the intercom system 220 after decryption is prevented and, as a result, the first radio is deactivated.

If, however, it is determined at step 320 that the incoming audio signal that is received via the first radio is unencrypted, i.e., clear, e.g., if the incoming audio signal is received via the radio 214 of FIG. 2, then the method 300 continues at step 350.

At step 350, it is determined whether transmission of an encrypted audio signal via another, i.e., a second radio of the plurality of radios 210 of FIG. 2 is in progress, e.g., via the radio 212 of FIG. 2. For instance, the transmission is detected by monitoring the plurality of connection lines 250 of FIG. 2, which function as receipt indication lines.

If transmission of an encrypted audio signal via the second radio, e.g., via the radio 212 of FIG. 2, is in progress, the method 300 continues at step 360. Otherwise, the method 300 continues again at step 340, where receipt of the incoming audio signal via the first radio, e.g., via the radio 214 of FIG. 2, is authorized and continued.

At step 360, transmission of the encrypted audio signal via the second radio is blocked. For instance, the second radio is deactivated for blocking transmission of the encrypted audio signal by sending a discrete blocking command to the second radio for disabling transmission of the encrypted audio signal via the second radio. Preferably, the second radio is deactivated before encryption.

Optionally, the method 300 may further comprise a step of providing a visible and/or audible indication, if receipt of the incoming audio signal is blocked at step 335, or if transmission of the encrypted audio signal is blocked at step 360. In other words, provision of a respective visible and/or audible indication is considered to be part of the steps 335 and 360. By way of example, a suitable visible and/or audible indication may be provided by the one or more associated indicators 260 of FIG. 2.

Figure 4:
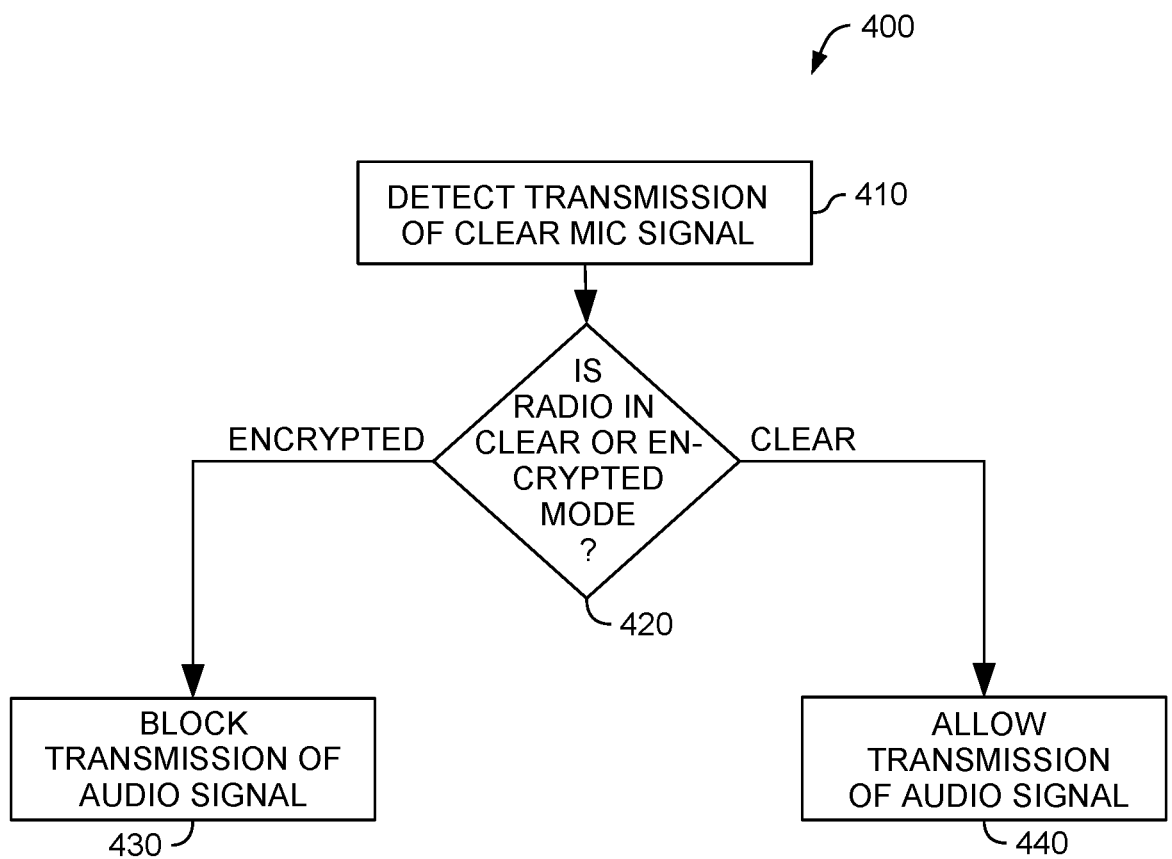
FIG. 4 shows a flow diagram illustrating another operation of the communication system of FIG. 2 in accordance with some embodiments.

FIG. 4 shows an illustrative method 400 of operating the communication system 200 of FIG. 2, e.g., in the helicopter 100 of FIG. 1. According to one aspect, the method 400 comprises a plurality of steps which are preferably performed by the security module 240 of the communication system 200 of FIG. 2.

The method 400 starts at step 410 with detection of a transmission of an unencrypted, i.e., clear microphone signal, e.g., an unencrypted microphone signal coming from the co-pilot headset 217 of FIG. 2 or the pilot headset 218 of FIG. 2.

At step 420, it is determined which radios of the plurality of radios 210 of the communication system 200 of FIG. 2 operate in encrypted mode and which operate in unencrypted, i.e., clear mode. Thus, at step 430 transmission of audio signals via all radios of the plurality of radios 210 which operate in encrypted mode is blocked, while at step 440 transmission of audio signals via all radios of the plurality of radios 210 which operate in unencrypted, i.e., clear mode is authorized during the transmission of the unencrypted, i.e., clear microphone signal.

Optionally, the method 400 may further comprise a step of providing a visible and/or audible indication, if transmission of audio signals via all radios of the plurality of radios 210 which operate in encrypted mode is blocked. In other words, provision of a respective visible and/or audible indication is considered to be part of the step 430. By way of example, a suitable visible and/or audible indication may be provided by the one or more associated indicators 260 of FIG. 2.

REFERENCE LIST 100 aircraft
110 main rotor
112, 113 rotor blades
114 rotor head
115 rotor shaft
120 fuselage
123 cabin
127 rear fuselage
130 tail boom
135 horizontal stabilizer
140 counter-torque device
145 tail rotor
150 fin
200 communication system
210 plurality of radios
212, 214, 216 radios
217 headset co-pilot
218 headset pilot
220 aircraft intercom system
225 information transmission line
230 plurality of communication lines
232, 233, 234, 235, 236, 237, 238, 239 communication lines
240 communications security monitoring and control device
250 plurality of connection lines
252, 253, 254, 255, 256, 257, 258, 259 connection lines
260 indicators
270 switch
300 method
310, 320, 330, 335, 340, 350, 360 method steps
400 method
410, 420, 430, 440 method steps

What is claimed is:

1. A communication system for an aircraft, comprising:
a plurality of radios including at least:
a first radio that is operable in an encrypted mode for transmitting/receiving encrypted audio signals,
a second radio that is operable in a clear mode for transmitting/receiving unencrypted audio signals;
an intercom system that interconnects the plurality of radios, wherein the plurality of radios is connected to the intercom system via a plurality of communication lines; and
a security module that is configured to connect or disconnect selected ones of the plurality of communication lines between the plurality of radios and the intercom system for inhibiting simultaneous transmission of an encrypted audio signal via the first radio and an unencrypted audio signal via the second radio.

2. The communication system of claim 1, wherein the security module is configured to deactivate the first radio for blocking receipt or transmission of an encrypted audio signal at the first radio, if the second radio is sending or receiving an unencrypted audio signal.

3. The communication system of claim 2, wherein the security module is configured to deactivate the first radio for blocking receipt of an encrypted audio signal at the first radio by disabling receipt of the encrypted audio signal at the first radio and/or disabling transmission of the encrypted audio signal via the first radio to the intercom system after decryption.

4. The communication system of claim 3, wherein the security module is configured to send a discrete blocking command to the first radio for disabling receipt of the encrypted audio signal at the first radio.

5. The communication system of claim 3, wherein the security module is configured to interrupt a communication line of the plurality of communication lines that connects the first radio to the intercom system for disabling transmission of the encrypted audio signal via the first radio to the intercom system after decryption.

6. The communication system of claim 1, wherein the security module is configured to deactivate the first radio for blocking transmission of an encrypted audio signal via the first radio before encryption, if the second radio is sending or receiving an unencrypted audio signal.

7. The communication system of claim 1, wherein the security module is configured to detect receipt of an encrypted audio signal via the first radio, or of an unencrypted audio signal via the second radio.

8. The communication system of claim 7, wherein the security module is configured to detect receipt of an encrypted audio signal via the first radio, or of an unencrypted audio signal via the second radio, by monitoring associated receipt indication lines of the first and second radios.

9. The communication system of claim 1, further comprising at least one indicator for indicating deactivation of the first radio.

10. The communication system of claim 9, wherein the at least one indicator is controlled by means of the security module.

11. The communication system of claim 1, further comprising a switch that is provided to enable switching-off of the security module.

12. An aircraft comprising the communication system of claim 1.

13. A method of operating a communication system according to claim 1, comprising:
 detecting receipt of an incoming audio signal via a radio of the communication system,
 determining whether the incoming audio signal is encrypted or unencrypted,
 if the incoming audio signal is encrypted, determining whether transmission of an unencrypted audio signal via another radio is in progress, and
 if transmission of an unencrypted audio signal via another radio is in progress, blocking (335) receipt of the incoming audio signal.

14. The method of claim 13, further comprising:
 if the incoming audio signal is unencrypted, determining whether transmission of an encrypted audio signal via another radio is in progress, and
 if transmission of an encrypted audio signal via another radio is in progress, blocking transmission of the encrypted audio signal.

15. The method of claim 13, further comprising:
 providing a visible and/or audible indication, if receipt of the incoming audio signal is blocked, or if transmission of the encrypted audio signal is blocked.

16. A communication system for an aircraft, the system comprising:
 a first radio operable in an encrypted mode to transmit/receive encrypted audio signals,
 a second radio operable in a clear mode to transmit/receive unencrypted audio signals;
 an intercom system interconnecting the first and second radios, wherein the first and second radios are connected to the intercom system via a plurality of communication lines; and
 a security module configured to connect or disconnect selected ones of the plurality of communication lines between the first and second radios and the intercom system, the security module configured to inhibit simultaneous transmission of an encrypted audio signal via the first radio and an unencrypted audio signal via the second radio.

17. The communication system of claim 16, wherein the security module is configured to deactivate the first radio for blocking receipt or transmission of an encrypted audio signal at the first radio, if the second radio is sending or receiving an unencrypted audio signal.

18. The communication system of claim 16, wherein the security module is configured to send a discrete blocking command to the first radio for disabling receipt of the encrypted audio signal at the first radio.

19. The communication system of claim 16, wherein the security module is configured to detect receipt of an encrypted audio signal via the first radio, or of an unencrypted audio signal via the second radio, by monitoring associated receipt indication lines of the first and second radios.

20. A communication system for an aircraft, the system comprising:
 a first radio operable in an encrypted mode for transmitting and receiving encrypted audio signals;
 a second radio operable in a clear mode for transmitting and receiving unencrypted audio signals;
 an intercom system operably coupled to the first and second radios via respective communication lines; and
 a security module configured to:
 detect whether the first radio is receiving or transmitting an encrypted audio signal and whether the second radio is simultaneously transmitting or receiving an unencrypted audio signal, and
 automatically inhibit, based on the detection of the detected signal type, communication via one of the radios by disabling at least one communication line coupling that radio to the intercom system to prevent simultaneous transmission of an encrypted audio signal via the first radio and an unencrypted audio signal via the second radio.

* * * * *